United States Patent
Chkilam et al.

(10) Patent No.: US 10,471,915 B2
(45) Date of Patent: Nov. 12, 2019

(54) PROTECTION CUSHION CONCEALMENT SYSTEM FOR VEHICLE ROLL BAR ASSEMBLY

(71) Applicants: Sahas Chkilam, Warren, MI (US); Jason E Schultz, Clarkston, MI (US)

(72) Inventors: Sahas Chkilam, Warren, MI (US); Jason E Schultz, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 74 days.

(21) Appl. No.: 15/715,366

(22) Filed: Sep. 26, 2017

(65) Prior Publication Data
US 2019/0092261 A1    Mar. 28, 2019

(51) Int. Cl.
*B60R 21/13* (2006.01)
*B60R 21/04* (2006.01)

(52) U.S. Cl.
CPC .............. *B60R 21/13* (2013.01); *B60R 21/04* (2013.01); *B60R 2021/0435* (2013.01); *B60R 2021/132* (2013.01)

(58) Field of Classification Search
CPC ...... B60R 2021/132; B60R 2021/0072; B60R 2021/0435; B60R 21/11; B60R 21/13; B60R 21/04; B62D 21/183; F16B 21/073; F16B 21/075
USPC .................................. 411/520, 521, 525, 526
See application file for complete search history.

(56) References Cited

U.S. PATENT DOCUMENTS

| | | | |
|---|---|---|---|
| 2,151,284 A * | 3/1939 | Tinnerman ............ | E05O 19/063 24/681 |
| 4,301,629 A | 11/1981 | Farr | |
| 4,865,505 A * | 9/1989 | Okada ..................... | B60N 3/046 411/512 |
| 4,905,429 A * | 3/1990 | Fukushima ............ | E04G 17/0644 52/127.5 |
| 5,470,184 A | 11/1995 | Chandler | |
| 5,533,237 A * | 7/1996 | Higgins .................. | F16B 5/065 24/289 |
| 5,651,562 A * | 7/1997 | Hagen .................... | B60R 21/215 280/728.2 |
| 5,671,513 A * | 9/1997 | Kawahara ............... | F16B 21/06 24/581.11 |
| 5,718,549 A * | 2/1998 | Noda ..................... | F16B 5/0635 411/349 |
| 5,992,917 A * | 11/1999 | Hilliard .................. | B60J 1/1815 296/103 |
| 6,273,494 B1 * | 8/2001 | Beigel ................ | B60H 1/00564 296/190.02 |
| 6,565,116 B1 * | 5/2003 | Tajima ................ | B60R 13/0206 24/297 |

(Continued)

FOREIGN PATENT DOCUMENTS

JP    2005343255 A  * 12/2005
JP    2005350009 A  * 12/2005

*Primary Examiner* — Laura Freedman
(74) *Attorney, Agent, or Firm* — Ralph E. Smith

(57) ABSTRACT

A concealment system for a first vehicle component having a cutout and receiving aperture exposed by removal of a second component, includes a pre-insert configured to be inserted into the receiving aperture, and a filler insert having an outer surface and configured to be inserted into the cutout such that the outer surface of the filler insert is substantially flush with a visible outer surface of the vehicle component. The filler insert being inserted into and retained within the pre-insert.

10 Claims, 5 Drawing Sheets

(56) References Cited

U.S. PATENT DOCUMENTS

| | | | | |
|---|---|---|---|---|
| 7,344,185 B2* | 3/2008 | Wright | ............... | B60R 13/0206 |
| | | | | 296/187.05 |
| 7,374,200 B2* | 5/2008 | Ikeda | ................... | B60R 21/213 |
| | | | | 280/728.2 |
| 7,547,061 B2* | 6/2009 | Horimatsu | ......... | B60R 13/0206 |
| | | | | 296/187.01 |
| 7,575,267 B2* | 8/2009 | Nakajima | .............. | B60J 3/0221 |
| | | | | 296/97.9 |
| 7,581,361 B1 | 9/2009 | Murkland | | |
| 7,837,224 B2* | 11/2010 | Benkler | ............. | B60R 13/0225 |
| | | | | 280/730.2 |
| D662,410 S | 6/2012 | Terrels et al. | | |
| 8,991,006 B2* | 3/2015 | Masanek, Jr. | .......... | B60N 3/044 |
| | | | | 16/4 |
| 9,649,993 B1* | 5/2017 | Dickinson | .......... | B60R 13/0206 |
| 9,827,920 B2* | 11/2017 | Sanchez Cruz | ..... | B60R 13/0206 |
| 10,160,300 B2* | 12/2018 | Burkhardt | ............. | B60J 7/1265 |
| 2003/0094828 A1* | 5/2003 | Nagamoto | ......... | B60R 13/0206 |
| | | | | 296/39.1 |
| 2006/0117535 A1* | 6/2006 | Fraser | ................ | B60R 13/0206 |
| | | | | 24/289 |
| 2007/0114766 A1* | 5/2007 | Hwang | ................ | B60R 21/213 |
| | | | | 280/730.2 |
| 2014/0154029 A1 | 6/2014 | Pelc | | |
| 2015/0321622 A1* | 11/2015 | Dickinson | .......... | B60R 13/0206 |
| | | | | 24/458 |
| 2018/0244133 A1* | 8/2018 | Luo | ......................... | B60J 1/006 |

* cited by examiner

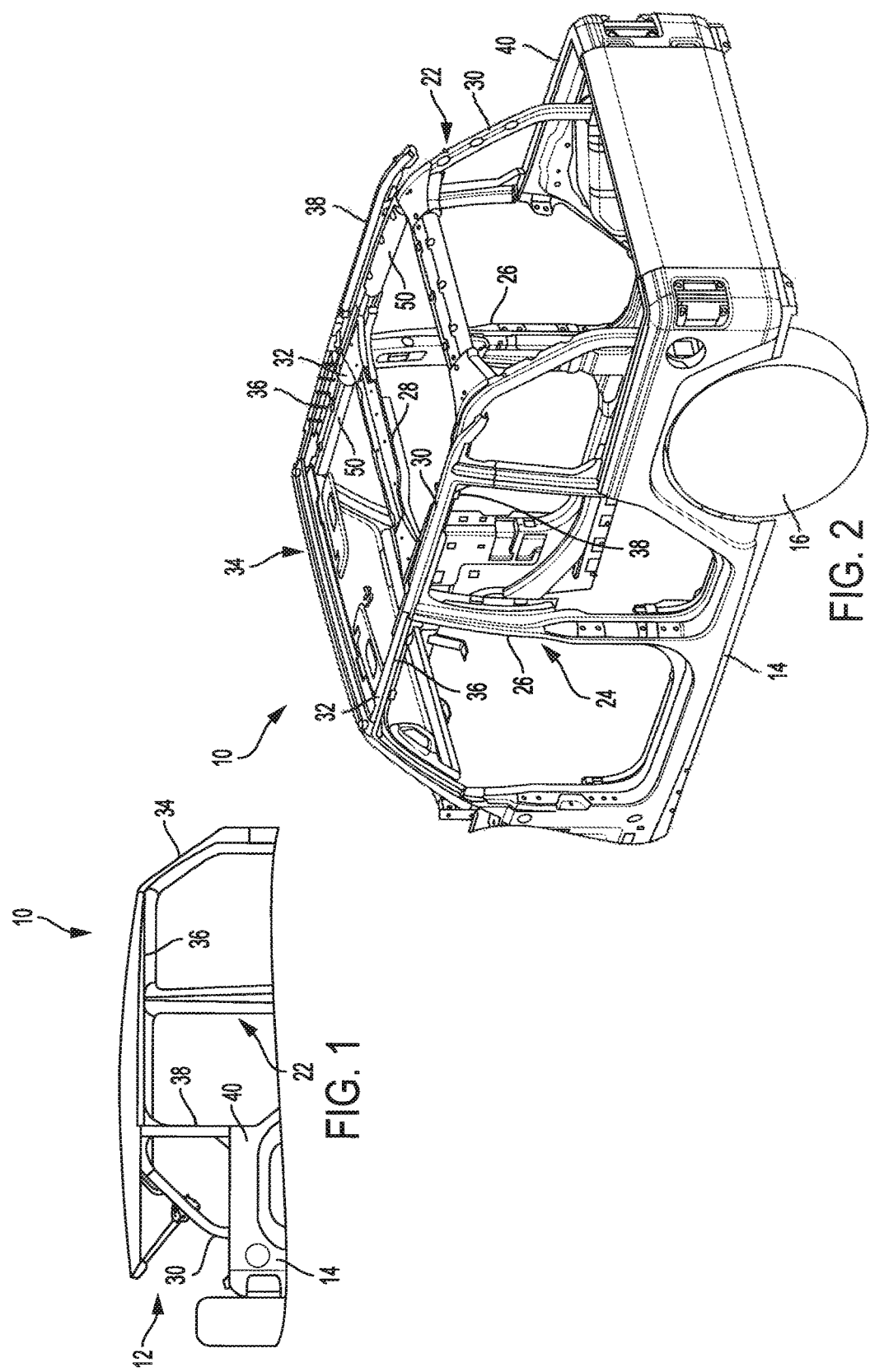

PROTECTION CUSHION CONCEALMENT SYSTEM FOR VEHICLE ROLL BAR ASSEMBLY

FIELD

The present application relates generally to convertible top systems for a vehicle and, more particularly, to a concealment system for a protection cushion of a roll bar assembly associated with a vehicle convertible top system.

BACKGROUND

It is known in the motor vehicle art to provide a convertible top, which may be folded back or removed from the vehicle. In one example, the convertible top is constructed of a flexible fabric (referred to as a soft top) and is folded back to a storage position or otherwise removed from an installed position. Soft tops provide a user with the benefit of open air driving while affording available protection in the event of adverse weather conditions. Most known soft tops are designed to be easily retracted to a stored position, either under a source of power or manually. However, portions of a vehicle roll bar assembly or top system may be undesirably exposed once the soft/hard top is removed. Accordingly, while known vehicle top systems work well for their intended purpose, it is desirable to provide an improved vehicle soft top system.

SUMMARY

In accordance with an exemplary aspect of the invention, an insert system for a first vehicle component having a cutout and receiving aperture exposed by removal of a second component from the vehicle is provided. The insert system includes, in one exemplary implementation, a pre-insert configured to be inserted into the receiving aperture, and a filler insert having an outer surface and configured to be inserted into the cutout such that the outer surface of the filler insert is substantially flush with a visible outer surface of the vehicle component. The filler insert is inserted into and retained within the pre-insert.

In addition to the foregoing, the described insert system may include one or more of the following features: wherein the pre-insert includes a main body portion, a plurality of insert retention tabs, and a plurality of retention arms; wherein the main body portion includes a cylindrical wall having an outer surface and an inner surface; wherein each insert retention tab extends outwardly from the main body portion, the retention tabs configured to engage a wall defining the receiving aperture to retain the pre-insert within the first vehicle component; wherein the plurality of insert retention tabs comprises a pair of opposed insert retention tabs; and wherein each retention arm extends inwardly from the main body portion, the retention arms configured to engage the filler insert to retain the filler insert within the pre-insert.

In addition to the foregoing, the described insert system may include one or more of the following features: wherein the plurality of retention arms comprises four equally spaced retention arms; wherein the filler insert includes a base and a shaft extending therefrom; wherein the base is a complementary shape to the cutout; wherein the shaft includes a proximal end and a distal end, the proximal end coupled to the base and the distal end having a substantially spherical shape; and wherein a diameter of the substantially spherical shape is slightly larger than a diameter of the pre-insert such that a force is required for insertion and removal of the shaft from the pre-insert.

In accordance with another exemplary aspect of the invention, a concealment system for a vehicle having a roll bar assembly is provided. The concealment system includes, in one exemplary implementation, a roll bar assembly having a receiving aperture, a first component coupled to the roll bar assembly and having a cutout formed in an outer surface of the first component, the cutout exposed by removal of a second component from the vehicle, wherein the cutout at least partially surrounds the receiving aperture, and an insert system. The insert system includes a pre-insert configured to be inserted into the receiving aperture formed in the roll bar assembly, and a filler insert having an outer surface and a shape complimentary to a shape of the cutout, the filler insert configured to be removably inserted into the cutout and into the pre-insert such that the filler insert is removably retained within the pre-insert and the outer surface is substantially flush with an outer surface of the first vehicle component so as to at least substantially conceal the cutout and the aperture.

In addition to the foregoing, the described vehicle may include one or more of the following features: wherein the first component is an impact cushion and the second component is a door rail removably coupled to the impact cushion and the roll bar assembly; wherein the roll bar assembly includes a main roll bar, a pair of opposed side bars each extending between the main roll bar and a windshield assembly of the vehicle, and a pair of opposed sport bars each extending between the main roll bar and a rear of the vehicle; and wherein the door rail includes a clamp assembly configured to at least partially wrap around the roll bar assembly.

In addition to the foregoing, the described vehicle may include one or more of the following features: wherein the clamp assembly includes an upper clamp portion extending from a main body of the door rail, and a lower clamp portion hingedly coupled to the upper clamp portion, wherein the lower clamp portion is configured to be received in the cutout; wherein the pre-insert includes a main body portion, a plurality of insert retention tabs, and a plurality of retention arms, wherein the main body portion includes a cylindrical wall having an outer surface and an inner surface, wherein each insert retention tab extends outwardly from the main body portion, the retention tabs configured to engage a wall defining the cutout aperture to retain the pre-insert within the first vehicle component, and wherein each retention arm extends inwardly from the main body portion, the retention arms configured to engage the filler insert to retain the filler insert within the pre-insert; and wherein the filler insert includes a base and a shaft extending therefrom.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a side view of an example vehicle and soft top assembly in accordance with the principles of the present disclosure;

FIG. 2 is a rear perspective view of the vehicle with the soft top assembly removed in accordance with the principles of the present disclosure;

DESCRIPTION

Figure 3:
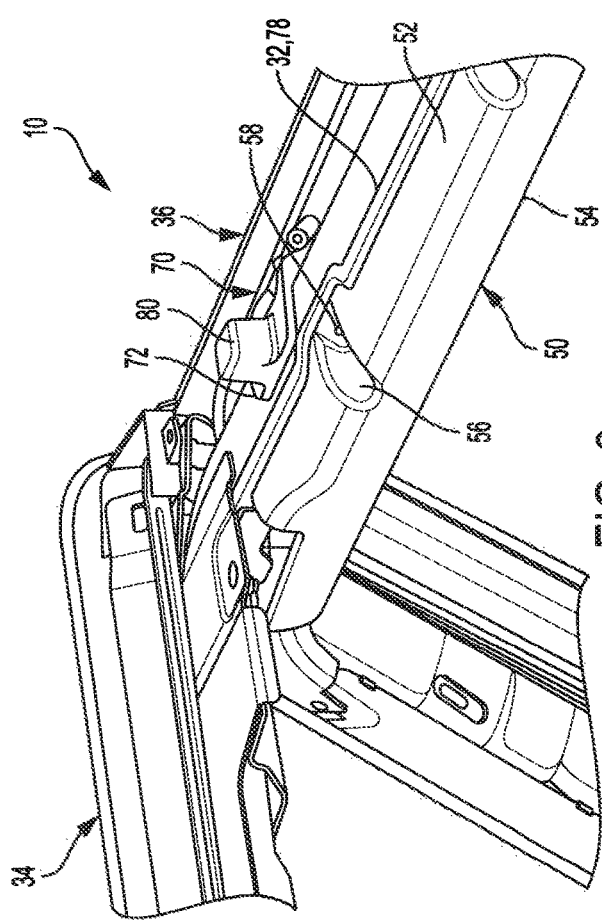
FIG. 3 is an enlarged portion of FIG. 2 illustrating an example impact cushion and door rail, in accordance with the principles of the present disclosure.

With initial reference to FIGS. 1-3, an exemplary soft top assembly for a vehicle 10 is shown and generally identified at reference numeral 12. FIGS. 1 and 2 illustrate soft top assembly 12 in a deployed position to protect passengers in the vehicle interior from weather conditions such as wind, rain, or snow. The soft top assembly 12 can be articulated between its deployed position and a retracted position (not shown). Moreover, soft top assembly 12 may have one or more intermediate positions to provide varying overhead exposure to the passengers in the vehicle interior, or the soft top assembly 12. However, when the soft top assembly 12 is removed (FIG. 2), for example when utilizing a hard top or power top assemblies, portions of the vehicle 10 may be exposed and reduce the aesthetic appearance of the vehicle, as described herein in more detail.

In the example implementation shown in FIG. 2, the vehicle 10 generally includes a vehicle body 14, vehicle road wheels 16, and front and rear passenger seating (not shown). A roll bar assembly 22 extends upwardly from the vehicle body 14 and includes a generally U-shaped main roll bar 24 formed by a pair of laterally spaced apart vertical members 26 interconnected by a transverse member 28. A pair of rear roll or sport bars 30 are coupled to the main roll bar 24 and extend rearward therefrom and downwardly to the vehicle body 14. A pair of side bars 32 are coupled to the main roll bar 24 and extend forwardly to a vehicle windshield assembly 34.

In the example embodiment, a pair of forward door rails 36 are removably coupled to the main roll bar 24 and each extends vertically along one vertical member 26 and laterally along one side bar 32. A pair of rearward door rails 38 each extend vertically between one sport bar 30 and a rear side panel 40 of the vehicle body 14, and laterally along a portion of the sport bar 30.

Although the vehicle 10 and roll bar assembly 22 are illustrated in FIG. 2 as a four-door configuration, the vehicle may be arranged in other configurations such as a two-door configuration. It will be understood that the soft top assembly for the two-door configuration may include fewer or additional components, but is otherwise generally similar to the soft top assembly 12 described herein.

Figure 4:
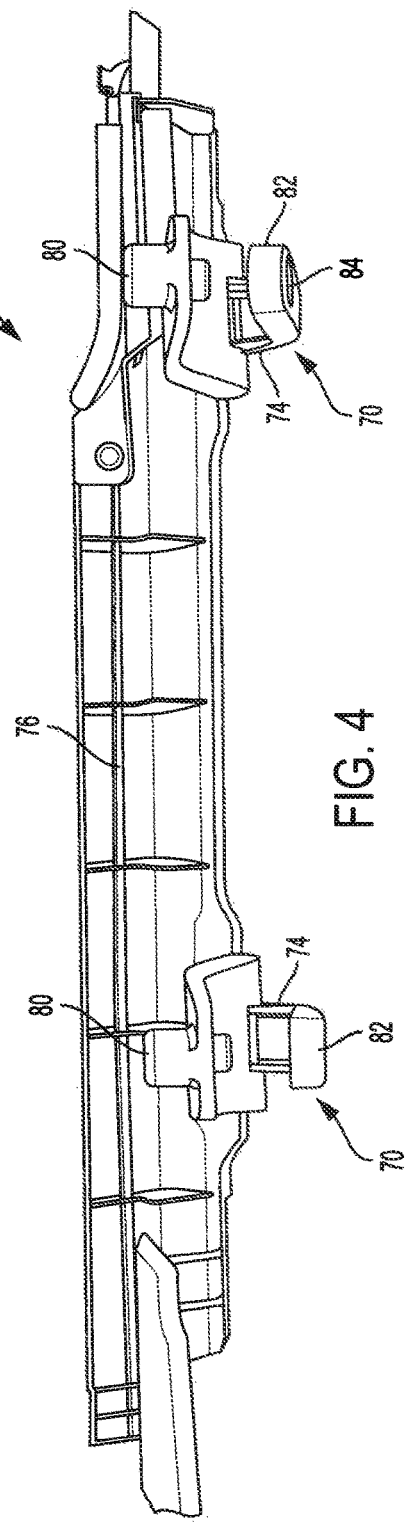
FIG. 4 is a perspective view of an example door rail that may be utilized with the vehicle shown in FIGS. 1 and 2, in accordance with the principles of the present disclosure.

With further reference to FIGS. 3 and 4, portions of the roll bar assembly 22 may include a protecting padding or impact cushion 50 configured to absorb any impact between the roll bar assembly 22 and a passenger to facilitate preventing potential injury thereto. In the example embodiment, vehicle 10 includes four impact cushions 50 each located along a vehicle interior side of the roll bar assembly 22. However, it will be appreciated that roll bar assembly 22 may have any suitable number of impact cushions 50.

In the example embodiment, a first impact cushion 50 is coupled to an interior side of the passenger side bar 32 and extends between the main roll bar 24 and the windshield assembly 34 (see FIG. 3). A second impact cushion 50 is coupled to an interior side of the driver side bar 32 and extends between the main roll bar 24 and the windshield assembly 34. A third impact cushion 50 is coupled to an interior side of the vehicle right side sport bar 30 and extends along at least a portion of the sport bar 30. A fourth impact cushion 50 is coupled to an interior side of the vehicle left side sport bar 30 and extends along at least a portion of the sport bar 30.

Figure 8:
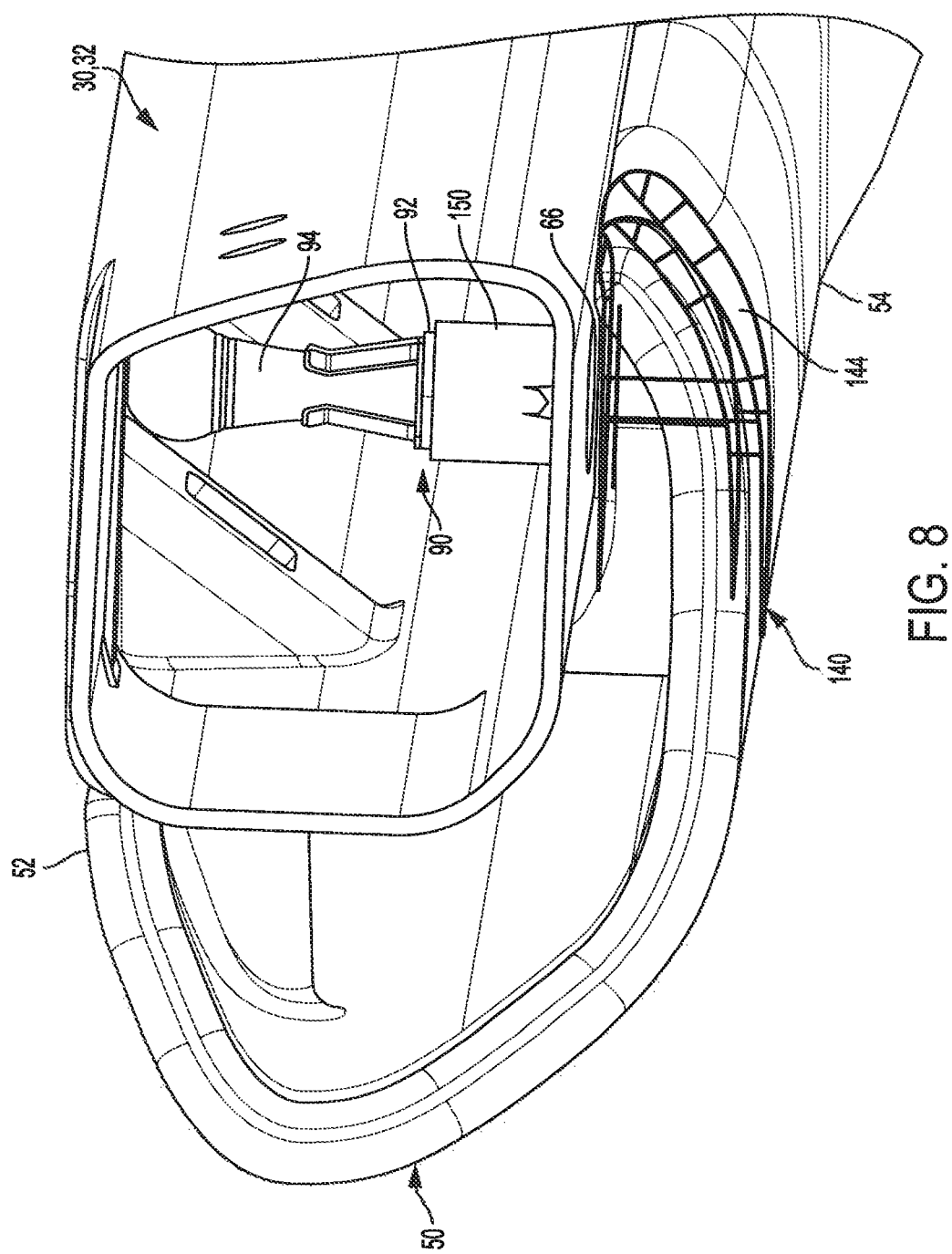
FIG. 8 is a sectional view of the insert system of FIG. 5 assembled to the impact cushion and roll bar assembly, in accordance with the principles of the present disclosure.

As shown in FIG. 3, each impact cushion 50 includes an upper surface 52 and an opposed lower surface 54 (see also FIG. 8). The upper surface 52 includes one or more indentations 56 disposed adjacent to a fastener aperture 58. Each indentation 56 is configured to provide clearance for a fastener (not shown) to be inserted into fastener aperture 58 and thereby couple impact cushion 50 to the roll bar assembly 22.

Figure 5:
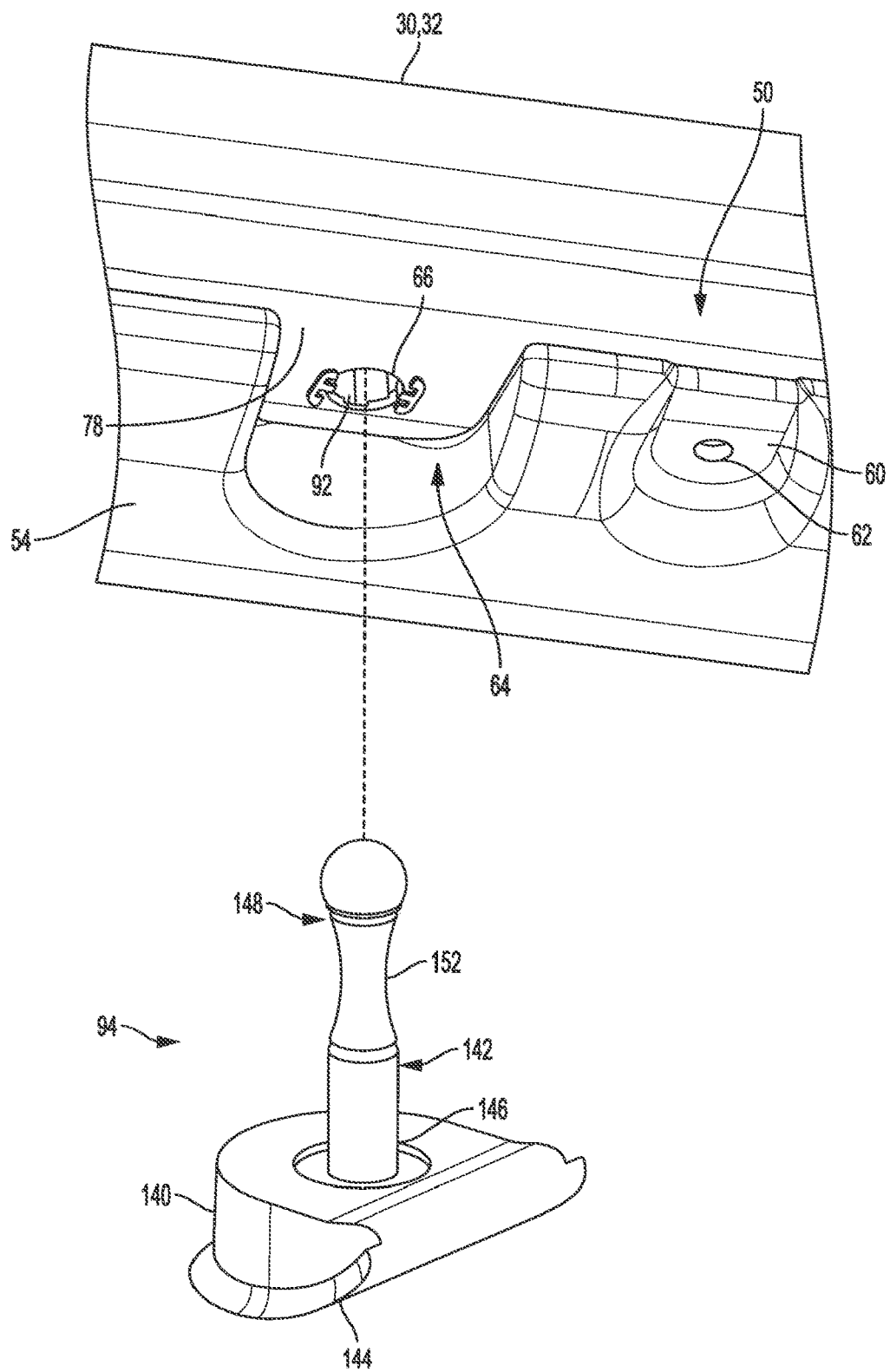
FIG. 5 is a perspective view of an example insert system, before assembly, for the impact cushion shown in FIGS. 2 and 3, in accordance with the principles of the present disclosure.

Similarly, the lower surface 54 includes one or more indentations 60 having a fastener aperture 62 (see FIG. 5). Each indentation 60 is configured to receive a fastener (not shown) to be inserted into fastener aperture 62 and thereby further couple impact cushion 50 to the roll bar assembly 22. Further, as shown in FIG. 5, the impact cushion lower surface 54 also includes one or more cutouts 64 exposing a receiving aperture 66 formed in side bar 32 (or sport bar 30). Each cutout 64 is configured to receive a portion of one of door rails 36, 38, as is described herein in more detail.

With continued reference to FIG. 2, in the example implementation, each door rail 36, 38 is coupled to the roll bar assembly 22 by a clamp assembly 70. In the illustrated example, each door rail 36, 38 includes two clamp assemblies 70. However, each door rail 36, 38 may have any suitable number of clamp assemblies 70 to facilitate coupling the door rail to the roll bar assembly 22. Although there are some structural differences between door rails 36 and 38, clamp assemblies 70 are substantially similar. One example of door rail 36 will be described below, however, such description is equally applicable to door rails 38.

As shown in FIG. 4, each clamp assembly 70 includes an upper clamp portion 72 and a lower clamp portion 74. The upper clamp portion 72 is fixed to a main body 76 of the door rail 36 and is configured to rest against an upper surface 78 (FIG. 3) of the side bar 32. The upper clamp portion 72 includes a bolt end receiving portion 80 configured to threadably receive a clamp bolt (not shown). The lower clamp portion 74 is hingedly coupled to the upper clamp portion 72 and includes an arm 82 having a bolt aperture 84. The arm 82 is configured to be received within one of the cutouts 64 of impact cushion 50 such that bolt aperture 84 is aligned with receiving aperture 66. The clamp bolt is configured to be inserted through apertures 66, 84 and side bar 32 and into the bolt end receiving portion 80 to thereby clamp or couple door rail 36 to side bar 32.

When the soft top assembly 12 is not being utilized, the door rails 36, 38 are removed from the roll bar assembly 22. However, as shown in FIG. 5, this causes the cutouts 64 on the lower surface 54 of impact cushion 50 to be exposed to the interior of the vehicle 10, which may be unsightly to passengers. Accordingly, vehicle 10 includes an insert system 90 configured to be inserted into and conceal the cutout 64.

With further reference to FIGS. 5-8, the insert system 90 generally includes a retention insert or pre-insert 92, and an impact cushion insert or filler insert 94. Pre-insert 92 is configured to be inserted into the receiving aperture 66 disposed within the cutout 64, as shown in FIGS. 5 and 8. Filler insert 94 is configured to be inserted into the pre-insert 92 such that insert 94 fills or substantially fills the cutout 64 and establishes a smooth or continuous lower surface 54.

Figure 7:
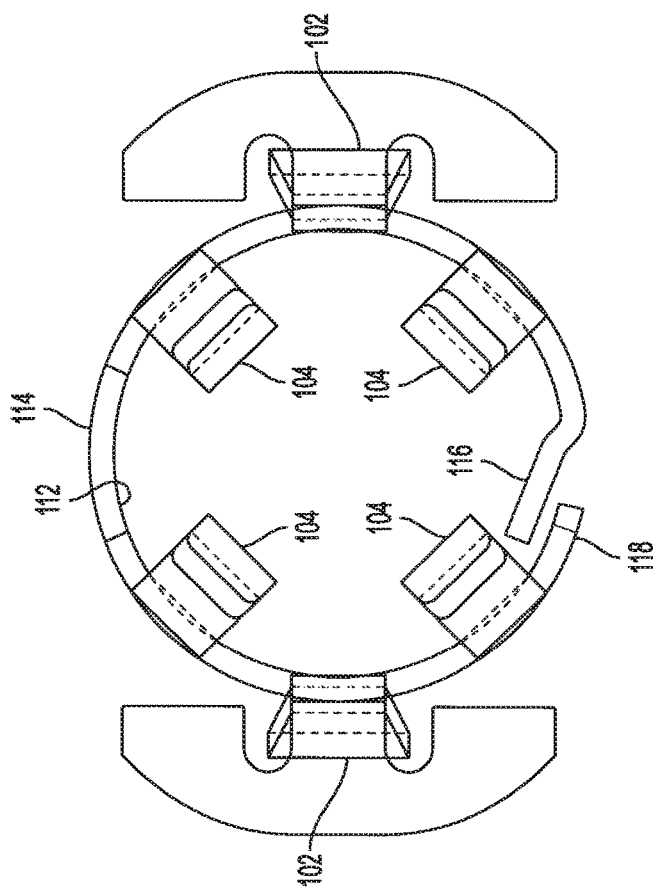
FIG. 7 is a top view of the pre-insert shown in FIG. 6.
Figure 6:
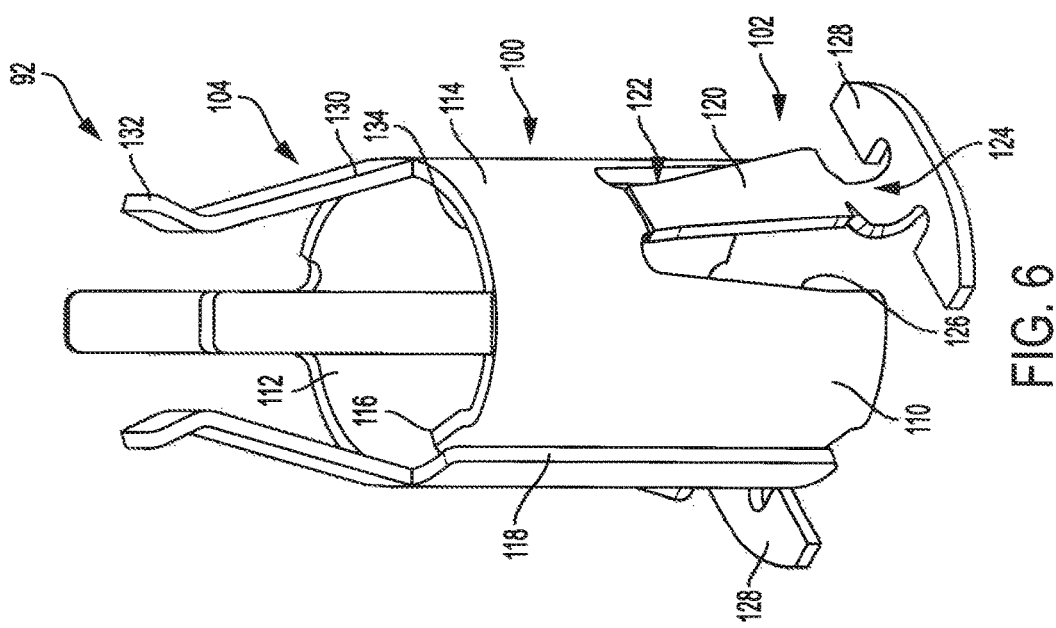
FIG. 6 is a perspective view of an example pre-insert of the insert system shown in FIG. 5, in accordance with the principles of the present disclosure.

FIGS. 6 and 7 illustrate pre-insert 92 in more detail. In the illustrated embodiment, pre-insert 92 generally includes a main body portion 100, a plurality of retention tabs 102, and a plurality of retention arms 104.

In the example embodiment, main body portion 100 includes a cylindrical or substantially cylindrical wall 110 having an inner surface 112 and an outer surface 114. As shown, main body wall 110 is discontinuous and includes a first end 116 and an opposite second end 118. Such discontinuity enables the main body portion 100 to be squeezed or compressed such that first and second ends 116, 118 further overlap, thereby reducing the diameter of cylindrical main body portion 100 and making it easier to insert pre-insert 92 into the receiving aperture 66. Moreover, once the compressive force is released, the main body wall expands into contact with the walls defining aperture 66 to facilitate retention of pre-insert 92 within aperture 66 and thus roll bar assembly 22.

As shown in FIG. 6, each retention tab 102 includes a leg 120 having a proximal end 122 and a distal end 124. The proximal end 122 is coupled to main body cylindrical wall 110 within a cutaway 126 formed in the cylindrical wall 110, thereby enabling leg 120 to flex inward and outward without contacting wall 110. As illustrated, leg 120 is angled outwardly from cylindrical wall 110 as it extends from proximal end 122 to distal end 124, which establishes an interference fit between leg 120 and the walls defining aperture 66 to facilitate retention of pre-insert 92 within aperture 66 and thus roller bar assembly 22. Distal end 124 includes wings or flanges 128 configured to abut against the roll bar assembly 22 when pre-insert 92 is inserted into aperture 66, as shown in FIG. 5. In this way, flanges 128 facilitate preventing the pre-insert 92 from being inserted too far into aperture 66, while also providing a portion of pre-insert 92 that can be gripped to flex retention tabs 102 inward to subsequently remove pre-insert 92 from within aperture 66.

As shown in FIGS. 5 and 6, each retention arm 104 includes a proximal end 130 and a distal end 132. The proximal end 130 is coupled to main body cylindrical wall 110 at an edge 134 thereof. As illustrated, retention arm 104 is angled inwardly from cylindrical wall 110 as it extends from proximal end 130 to distal end 132 such that retention arms 104 are configured to grip or otherwise establish an interference fit with filler insert 94 when inserted into pre-insert 92. Retention arms 104 are configured to flex outward to receive filler insert 94 and return inwardly when insert 94 is removed.

FIGS. 5 and 8 illustrate filler insert 94 in more detail. As described herein, filler insert 94 is configured to be inserted into and conceal impact cushion cutout 64. In the example embodiment, filler insert 94 generally includes a base 140 and a shaft 142 extending therefrom. Base 140 has a shape complementary to cutout 64 such that an outer surface 144 of the base 140 is flush with or substantially flush with impact cushion lower surface 54 when filler insert 94 is inserted into cutout 64.

In the example embodiment, shaft 142 includes a proximal end 146 and a distal end 148. Proximal end 146 is coupled to base 140, and distal end 148 is generally spherical. However, distal end 148 may have any suitable shape that enables filler insert 94 to function as described herein. In the example implementation, the diameter of spherical distal end 148 is slightly larger than the diameter of aperture 66 and/or clamp insert main body portion 100 such that a force is required for insertion and removal of shaft 142 into/from pre-insert 92. This facilitates unintentional removal of filler insert 94 from within cutout 64.

As shown in FIG. 8, roll bar 30, 32 includes a receiving tube 150 sized to receive clamp insert main body portion 100. In this way, retention tabs 102 extend outwardly against receiving tube 150 to maintain pre-insert 92 within aperture 66. Shaft proximal end 146 has a larger diameter sized to be received within main body cylindrical wall 110, and shaft distal end 148 includes a necked down smaller diameter 152 configured to be contacted by tab retention arms 104 to further maintain pre-insert 92 within aperture 66. In this way, pre-insert 92 is securely positioned within aperture 66 and maintains filler insert 94 within cutout 64 to provide an aesthetically pleasing surface when door rails 36, 38 are removed.

Described herein are systems and method for concealing portions of a vehicle roll bar assembly exposed by the removal of components from a removable top system. An insert system includes an initial pre-insert and a subsequent filler insert. A cutout is exposed by the removal of a soft top door rail, and the pre-insert is configured for insertion into an aperture of the roll bar assembly set within the cutout. The filler insert is configured to be removably inserted into the pre-insert and includes a shape complementary to the cutout. As such, once inserted, the filler insert fills the cutout and provides a finished-look surface.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A concealment system for a vehicle having a roll bar assembly, the concealment system comprising:
   a receiving aperture formed in the roll bar assembly;
   a first component coupled to the roll bar assembly and having a cutout formed in an outer surface of the first component, the cutout exposed by removal of a second component from the vehicle, wherein the cutout at least partially surrounds the receiving aperture; and
   an insert system comprising:
      a pre-insert configured to be inserted into the receiving aperture when the second component is removed from the vehicle; and
      a filler insert having an outer surface and a shape complimentary to a shape of the cutout, the filler insert configured to be removably inserted into the cutout and into the pre-insert such that the filler insert is removably retained within the pre-insert and the outer surface of the filler insert is substantially flush with the outer surface of the first component so as to at least substantially conceal the cutout and conceal the aperture,
   wherein the first component is a protection cushion and the second component is a door rail removably coupled to the protection cushion and the roll bar assembly, the door rail configured to be removed from the vehicle when a soft top is not utilized on the vehicle.

2. The concealment system of claim 1, wherein the door rail includes a clamp assembly configured to at least partially wrap around the roll bar assembly.

3. The concealment system of claim 2, wherein the clamp assembly includes an upper clamp portion extending from a main body of the door rail, and a lower clamp portion hingedly coupled to the upper clamp portion, wherein the lower clamp portion is configured to be received in the cutout.

4. The concealment system of claim 1, wherein:
the pre-insert includes a main body portion, a plurality of insert retention tabs, and a plurality of retention arms,
the main body portion includes a cylindrical wall having an outer surface and an inner surface,
each insert retention tab extends outwardly from the main body portion, the retention tabs configured to engage a wall defining the receiving aperture to retain the pre-insert within the first component, and
each retention arm extends inwardly from the main body portion, the retention arms configured to engage the filler insert to retain the filler insert within the pre-insert.

5. The concealment system of claim 4, wherein the plurality of retention arms comprises four equally spaced retention arms.

6. The concealment system of claim 1, wherein the filler insert includes a base and a shaft extending therefrom.

7. The concealment system of claim 6, wherein the base includes the complementary shape to the shape of the cutout.

8. The concealment system of claim 6, wherein the shaft includes a proximal end and a distal end, the proximal end coupled to the base and the distal end having a substantially spherical shape.

9. The concealment system of claim 8, wherein a diameter of the substantially spherical shape is slightly larger than a diameter of the pre-insert such that a force is required for insertion and removal of the shaft from the pre-insert.

10. The concealment system of claim 1, wherein the roll bar assembly comprises:
a main roll bar;
a pair of opposed side bars each extending between the main roll bar and a windshield assembly of the vehicle; and
a pair of opposed sport bars each extending between the main roll bar and a rear of the vehicle.

* * * * *